United States Patent

[11] 3,586,052

[72] Inventors Katsuro Abe
Matsudo-shi;
Kozo Ono, Tokyo, both of, Japan
[21] Appl. No. 802,985
[22] Filed Feb. 27, 1969
[45] Patented June 22, 1971
[73] Assignee Hitachi, Ltd.
Tokyo, Japan
[32] Priority Mar. 14, 1968
[33] Japan
[31] 43/16302

[54] ROTARY TYPE DISTRIBUTION VALVE FOR USE IN HYDRAULIC DEVICES
9 Claims, 5 Drawing Figs.
[52] U.S. Cl. ................................................. 137/625.23,
91/484, 91/498
[51] Int. Cl. ....................................................... F04b 1/10,
F04b 1/02
[50] Field of Search ........................................ 251/283;
103/161; 91/180, 491, 498, 484; 92/58;
137/625.23

[56] References Cited
UNITED STATES PATENTS

| | | | |
|---|---|---|---|
| 1,081,810 | 12/1913 | Carey .......................... | 103/161 |
| 1,989,212 | 1/1935 | Pascolini ..................... | 91/180 |
| 2,103,536 | 12/1937 | Inge............................. | 251/283 |
| 3,034,451 | 5/1962 | Sullivan ....................... | 103/161 |
| 3,122,104 | 2/1964 | Byers........................... | 103/161 |
| 3,470,825 | 10/1969 | Gsching........................ | 103/161 |

FOREIGN PATENTS

| 626,259 | 2/1959 | Italy ............................. | 103/162 |

*Primary Examiner*—William L. Freeh
*Attorney*—Craig, Antonelli, Stewart and Hill

ABSTRACT: A rotary type distribution valve for use in a hydraulic device comprising a cylindrical valve body having oil supply and discharge passages, and an annular valve body having a plurality of oil passages leading to the hydraulic device, said cylindrical and annular valve bodies being put in a sliding contact relationship at a distribution surface, means being provided for correcting the elastic deformation of the cylindrical valve body due to hydraulic oil pressure in the passages provided therein.

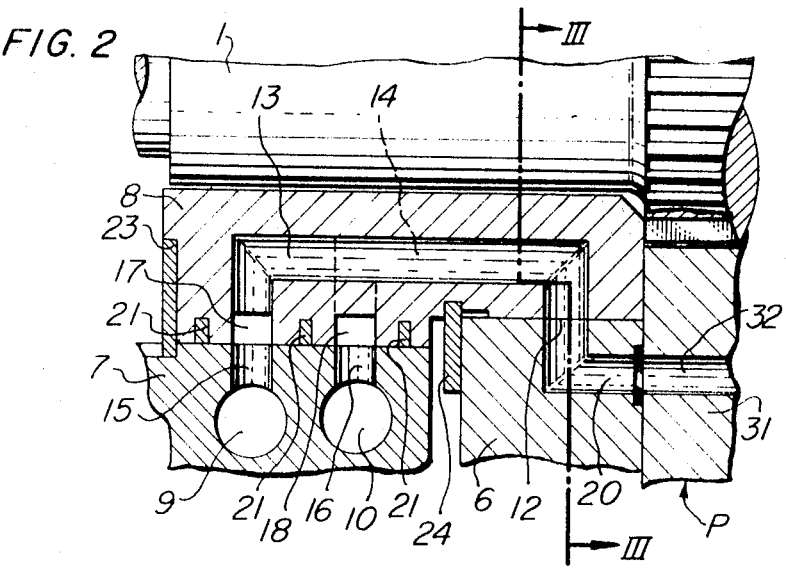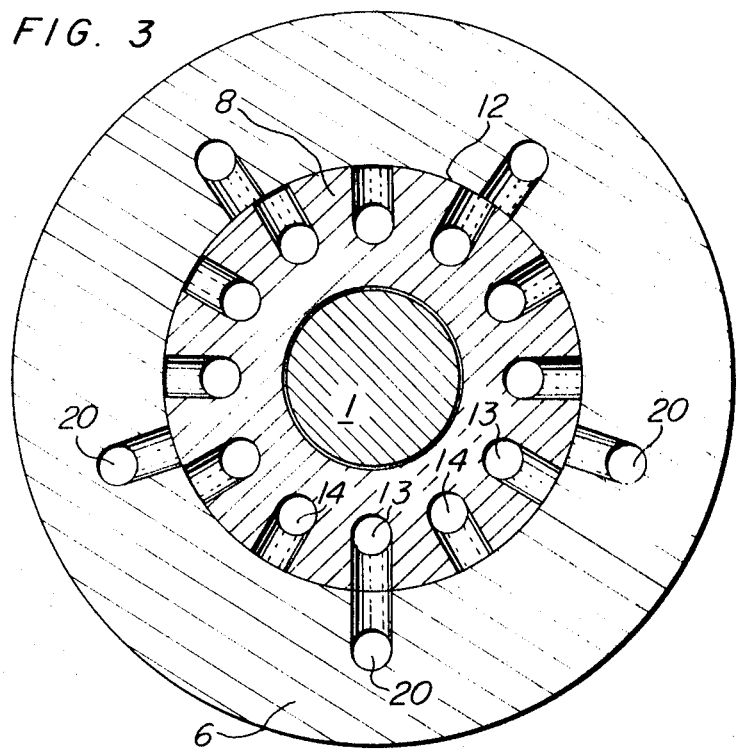

INVENTORS
KATSURO ABE
KOZO ONO

BY Craig, Antonelli, Stewart & Hill

ATTORNEYS

ROTARY TYPE DISTRIBUTION VALVE FOR USE IN HYDRAULIC DEVICES

The present invention relates to a distribution valve for use in a hydraulic device, and more particularly to a rotary type distribution valve therefor.

Hydraulic devices have been widely used in various machines and apparatus because they have many advantages features in respect of quick and positive operation, large power output, relatively simple construction and easy maintenance.

Among the hydraulic devices, there are known power means such as motors, oil transportation means such as pumps, flow control means such as valves, however, the most important one is a distribution valve which controls the inlet or outlet flow or distribution of high-pressure oil.

However, in such a distribution valve for a hydraulic device, high-pressure hydraulic oil is allowed to pass therethrough so that the valve has a tendency that oil will leak, Particularly, the problem of oil leakage becomes more critical when the valve itself is subjected to mechanical deformation.

Particularly, when the distribution valve is designed for a rotary type hydraulic device comprising a plurality of piston-cylinder mechanisms radially disposed about a rotatable shaft, and a casing surrounding the piston-cylinder mechanisms and having a waved inner peripheral surface, each of the piston-cylinder mechanisms having a piston provided at its outer end with a ball for engagement with the waved peripheral surface, the waved surface being operative with the rotation of the piston-cylinder mechanisms to control the reciprocating motion of the piston so as to effect the operation of the device as a hydraulic motor or pump, then the distribution valve is so constructed as to have a stationary part and a rotatable part slidably mounted around the stationary part, so that a substantial mechanical deformation is created.

An object of the present invention is to provide a rotary type distribution valve which suffers no or little, if any, leakage of oil when it is subjected to hydraulic pressure. The present invention aims further to achieve the above described object with a relatively simple construction.

These and other objects and advantages of the present invention will become apparent from the following descriptions with reference to the accompanying drawings.

FIG. 2 is a longitudinal sectional view showing on an enlarged scale the important part of the rotary type distribution valve of the device shown in FIG. 1;

FIG. 3 is a cross-sectional view of the rotary type distribution valve taken along the line III–111 of FIG. 2;

Figure 1:
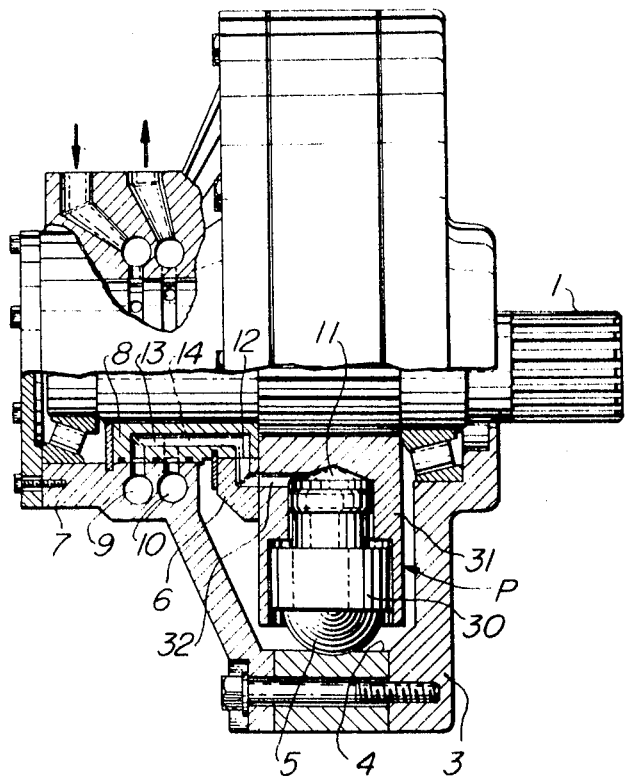
FIG. 1 is a partially sectional longitudinal view with a part broken away of a radial piston type hydraulic device having a rotary type distribution valve in accordance with the prior art.

Referring to FIG. 1, reference numeral 1 shows a rotatable shaft, P shows piston-cylinder mechanisms disposed radially around the rotatable shaft 1 and each comprising a piston 30 and a cylinder 31, and 3 shows a casing of the hydraulic device having a waved inner peripheral surface 4. Each piston 30 has on its outer end a ball 5 which is adapted to roll along the inner peripheral surface 4 of the casing 3 whereby the piston-cylinder mechanisms P is caused to rotate with the rotatable shaft 1.

However, it should be noted that this invention is not specifically related to only the radial piston type hydraulic device as referred to here above, but is broadly applicable to all rotary type distribution valves generally utilized in hydraulic devices.

As shown in FIGS. 1 through 3, the distribution valve comprises an annular valve body 6 secured to the piston-cylinder mechanism P and rotatable therewith and a cylindrical valve body 8 secured to a casing 7 of the distribution valve, which casing 7 is in turn secured to the casing 3 of the hydraulic device. Reference numerals 9 and 10 respectively show an oil supply and an oil discharge passage formed in the casing 7, reference numerals 13 and 14 respectively show several pairs of oil supply and discharge passages, said oil supply and discharge passages 13 and 14 being circumferentially spaced from each other and alternately disposed in the cylindrical valve body 8. The oil passages 15 and 16 are formed in the casing 7 and respectively communicate with the oil supply passage 9 and the oil discharge passage 10. The oil grooves 17 and 18 are formed in the outer peripheral surface of the cylindrical valve body 8 and respectively communicate with the passages 13 and 14.

The cylindrical valve body 8 is arranged around the rotatable shaft 1 with a slight clearance therebetween, and slidably engages at the contact or distribution surface 12 with a corresponding distribution surface of the annular valve body 6 as the piston-cylinder mechanisms P rotate.

The reference numeral 20 shows oil passages corresponding in number to the piston-cylinder mechanisms P and formed in the annular valve body 6, each of the passages being arranged for communication with each cylinder chamber 11 of each piston-cylinder mechanism P through a passage 32 formed in the cylinder 31. Thus, hydraulic oil is introduced into the cylinder chamber 11 through the passages 9, 15, 17, 13, 20, and 32, and discharged from the cylinder chamber 11 through the passages 32, 20, 14, 18, 16 and 10. As the annular valve body 6 rotates, two steps i.e. each of the cylinder chambers 11 is supplied with hydraulic oil and then the supplied oil is discharged from said cylinder chambers, are alternately carried out by having the oil passage 20 in the annular valve body 6 alternately connected with the oil supply passages 13 and the oil discharge passages 14 in the cylindrical valve body 8 at the distribution surface 12.

Reference numerals 21 show seals for preventing oil leakage, 23 shows a Cardin's coupling for securing the cylindrical valve body 8 to the casing 7, and 24 shows a stop ring.

If the hydraulic device operates as a hydraulic motor, then high-pressure hydraulic oil is on the one hand supplied through the passages 9, 15, 17, 13, 20 and 32 into the cylinder chambers 11 of the piston-cylinder mechanisms to cause the pistons 30 to move radially outwardly, and on the other hand low pressure hydraulic oil is discharged from the cylinder chambers 11 through the passages 32, 20, 14, 18, 16 and 10 as the pistons 30 are subsequently moved radially inwardly, and the cylindrical valve body 8 is subjected to an elastic deformation due to the high pressure of hydraulic oil passing through the supply passage 13 provided therein, whereby the gap between the annular valve body 6 and the cylindrical valve body 8 is increased at the distribution surface 12, so that along the distribution surface the hydraulic oil leaks from the interior of the distribution valve to the exterior thereof. Furthermore, the leakage from the oil supply passages 13 to the oil discharge passages 14 occurs due to the difference in oil pressure therebetween, thus the leakage is abruptly increased.

If the hydraulic device operates as a hydraulic pump, then the cylindrical valve body 8 is subjected to an elastic deformation due to the high pressure of hydraulic oil passing through the discharge passages 14, and the oil leakage occurs along the distribution surface 12 in the same manner as stated above.

According to the present invention, in order to improve the aforementioned conventional disadvantageous distribution valve, an oiltight zone is formed at the gap between the inner peripheral surface of the cylindrical valve body 8 and the outer peripheral surface of the rotatable shaft 1, said zone being supplied with pressurized hydraulic oil so that the elastic deformation of the cylindrical valve body is corrected by the hydraulic oil pressure, whereby even when the pressure of hydraulic oil passing through the valve body is increased the elastic deformation can be maintained at a small value and the gap at the distribution surface can be minimized.

Figure 4:
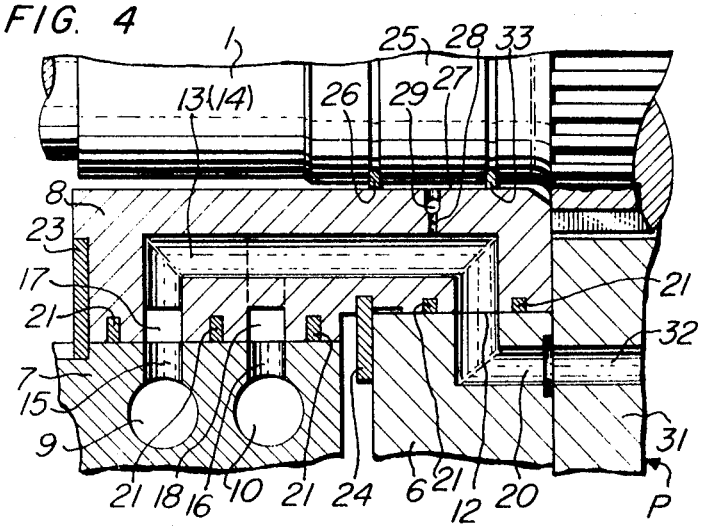
FIG. 4 is a longitudinal sectional view similar to FIG. 2 but showing a rotary type distribution valve in accordance with the present invention; and, FIG. 5 is a diagram showing the relations between the amount of leakage and the pressure of hydraulic oil in the prior art distribution valve and that of the present invention.

FIG. 4 is a longitudinal sectional view of the distribution valve in accordance with the present invention and the corresponding parts in this figure are identified by the same reference numerals as in FIG. 2. In this drawing, reference numeral 25 shows the sliding surface of the rotatable shaft 1 disposed inside the cylindrical valve body 8, the sliding surface being slidably engaged with the inner surface of the cylindrical valve body 8 as the shaft 1 is rotated. Reference numerals 26 and 33 show oil seals provided at the opposite ends of the slidably engaged portion. The oil seals 26 and 33 define an oiltight zone 27 between the rotatable shaft 1 and the cylindrical valve body 8. In one embodiment, at least one oil passage 28 is formed in the cylindrical valve body 8 to connect the oiltight zone 27 to at least one of the oil supply passages 13 or the oil discharge passages 14 in the cylindrical valve body 8, while in another embodiment, at least two oil passages 28 are formed in the cylindrical valve body 8 to connect the oiltight zone 27 to at least one of the oil supply passages 13 and at least one of the oil discharge passages 14. A check valve 29 is provided within each of said oil passages for preventing a reverse oil flow from said oiltight zone to the associated oil supply passage or oil discharge passage.

In operation, if the hydraulic device operates as a hydraulic motor, the high-pressure hydraulic oil is supplied through the oil supply passages 13, and if the hydraulic device operates as a hydraulic pump, then high-pressure hydraulic oil is discharged through the oil discharge passages 14. If the hydraulic motor or the hydraulic pump is driven in a direction opposite to the regular direction, the oil supply passages and the oil discharge passages will switch their function to oil discharge passages and oil supply passages respectively. A portion of the hydraulic oil is introduced through the oil passage 28 and the check valve 29 into the oiltight zone 27 to form a high-pressure oil band. Thus, the hydraulic oil pressure in the high-pressure oil band is effective to correct the elastic deformation of the cylindrical valve body 8 due to hydraulic oil pressure therein. As a result, the gap between the annular valve body 6 and the cylindrical valve body 8 at the distribution surface 12 can be maintained substantially constant or even decreased, so that oil leakage through this surface can be remarkably decreased. The check valve 29 is effective to prevent the reverse flow of the oil into the oil supply passage 13 or oil discharge passage 14, so that any fluctuation of the pressure in the oil supply passage 13 or oil discharge passage 14 will have no effect on the pressure in the oil band.

Figure 5:
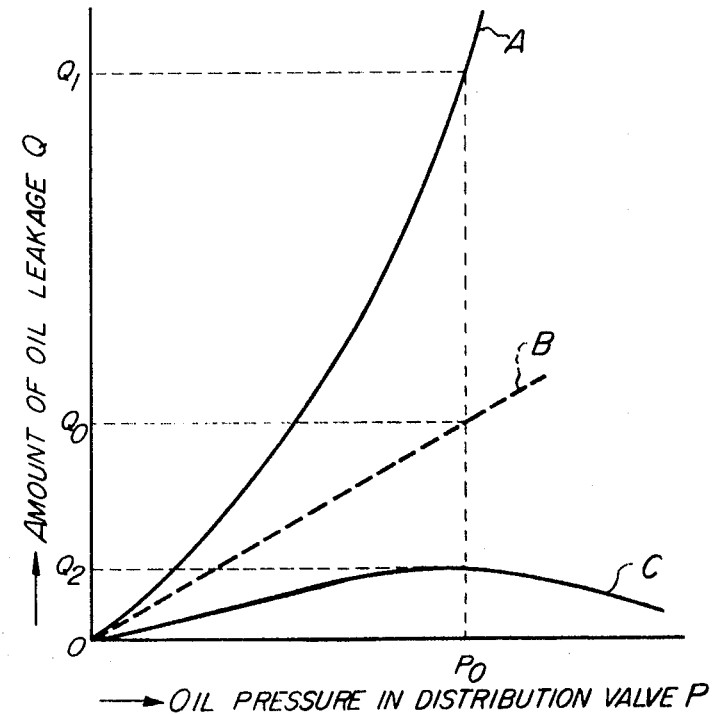

FIG. 5 shows the amount of oil leakage in the distribution valve in accordance with the present invention and that in a conventional distribution valve. In the graph, the oil pressure in the valve is indicated along the abscissa, while the amount of oil leakage from the distribution valve is indicated along the ordinate. The curve A indicates the amount of oil leakage in the conventional distribution valve and the broken line B indicates the amount of oil leakage in the distribution valve wherein the gap between the annular valve body 6 and the cylindrical valve body 8 at the distribution surface 12 is maintained constant. As will be apparent from a comparison of the curve A with the line B, the higher the oil pressure in the valve rises, the greater the difference of the amount of oil leakage between the curve A and the line B.

The curve C shows the amount of oil leakage in the distribution valve in accordance with the present invention. It can be easily understood that the comparison of the curve C with either the curve A or the line B shows that the amount of hydraulic oil leakage can be remarkably decreased by using the distribution valve in accordance with the present invention.

The amount of oil leakage in the distribution valve according to the present invention may vary with several design values such as the dimension of the distribution valve, the hydraulic oil pressure, the rotational speed of the annular valve body, etc., and the oil pressure $P_o$ under which maximum oil leakage is encountered is 100 to 300 Kg./cm.$^2$ gauge and as the pressure increases beyond the above value the amount of oil leakage gradually decreases as shown in the curve C.

As seen in FIG. 5, under the pressure $P_o$ the oil leakage indicated by the line B amounts to $Q_o$, and under the same pressure the oil leakage $Q_1$ of the curve A and the oil leakage $Q_2$ of the curve C respectively amount to $(2-10) \times Q_o$ and $(0.1-0.3) \times Q_o$.

Thus it is understood that a remarkable decrease, from one seventh to one hundredth, of the amount of oil leakage is obtained by the present invention as compared with the conventional valve.

What we claim is:

1. A rotary type distribution valve for use in a hydraulic device having a source of pressurized oil comprising a shaft; a cylindrical valve body having a plurality of pairs of oil supply and discharge passages therein and mounted around said shaft with a slight clearance therebetween; an annular valve body having a plurality of oil passages therein and contacted rotatably around said cylindrical valve body at their distribution surfaces; said oil passages in said cylindrical valve body having a port opening at the distribution surface of said annular valve body; said ports of the oil passages of said cylindrical and annular valve bodies being laterally disposed and intercommunicatable to each other alternately due to the relative rotation of the annular valve body with respect to the cylindrical valve body, wherein the improvement comprises a pair of oil sealing rings provided around said shaft to provide an oiltight zone in said clearance between said cylindrical valve body and said shaft, said zone being positioned within and opposing said distribution surfaces, and at least one oil passage formed in said cylindrical valve body to always supply pressurized oil from said source to said zone, whereby the leakage of oil from said distribution surfaces is thereby decreased.

2. A rotary type distribution valve for use in a hydraulic device in accordance with claim 1, in which at least one check valve is provided within each of said at least one oil passage for preventing a reverse oil flow from said oiltight zone to the associated oil supply passage or oil discharge passage.

3. A rotary type distribution valve for use in a hydraulic device in accordance with claim 1, in which said oiltight zone is defined by oil seal means provided at the opposite ends of said zone.

4. A rotary type distribution valve for use in a hydraulic device having a rotatable shaft comprising a cylindrical valve body having several pairs of oil supply and discharge passages therein and mounted on the rotatable shaft with a slight gap therebetween, and an annular valve body having a plurality of oil passages therein for communication with the hydraulic device and disposed so as to slidably contact at a distribution surface with said cylindrical valve body, said oil passages in said annular valve body being alternately brought into communication with said oil supply and discharge passages in said cylindrical valve body due to the rotation of the annular valve body, said distribution valve comprising an oiltight zone provided in the gap between said cylindrical valve body and said rotatable shaft in a space radially inwardly of said distribution surface, at least two oil passages formed in said cylindrical valve body and connecting said oiltight zone to at least one of the oil supply passages and at least one of the oil discharge passages, and at least two check valves provided within each of said at least two oil passages for preventing a reverse oil flow from said oiltight zone to the associated oil supply passage and oil discharge passage.

5. A rotary type distribution valve for use in a hydraulic device having a source of pressurized oil, a plurality of operable mechanisms to which the pressurized oil is to be supplied, and means for receiving the oil discharged from said mechanisms, comprising:
   a shaft;
   a cylindrical valve body arranged around said shaft with a slight clearance therebetween;

an annular valve body arranged around said cylindrical valve body and being rotatably connected at least at a part of the inner periphery thereof with at least a part of the outer periphery of said cylindrical valve body so that said connected parts form, respectively, an interconnecting surface portion;

said cylindrical valve body being provided therein with a plurality of oil passages each having a port opening at the interconnecting surface portion of said cylindrical valve body, which port is disposed so as to be spaced from and radially aligned on after another;

said annular valve body being provided therein with a plurality of oil passages each having a port opening at the interconnecting surface portion of said annular valve body, which port is disposed so as to be spaced from and radially aligned one after another and intercommunicatable with the ports of the oil passages of said cylindrical valve body, whereby the ports of the oil passages of said cylindrical valve body are mutually intercommunicated intermittently with those of said annular valve body;

means for communicating said source of the pressurized oil to a number of said oil passages of said cylindrical valve body and said discharged oil receiving means to the remainder of said oil passages;

means for communicating the plurality of operable mechanisms to the oil passages of said annular valve body, respectively, so that the pressurized oil from said source is supplied to and discharged from said operable mechanisms alternately as said cylindrical valve body and said annular valve body are relatively rotated with respect to each other;

a pair of oil sealing rings disposed axially spaced from each other around said shaft to contact with said cylindrical valve body and said shaft so that a closed oiltight band zone is defined in the clearance therebetween;

conduit means provided in said cylindrical valve body for communicating said number of said oil passages of said cylindrical valve body communicated with said source to said closed oiltight band zone; and check valve means inserted in said conduit means for preventing a reverse oil flow from said oiltight zone to thereby radially expand said cylindrical valve body outwardly, whereby the leakage of pressurized oil out of the interconnecting surface portions is decreased.

6. A rotary type distribution valve adapted to be used in a hydraulic device having pressurized oil supply means for supplying pressurized oil and oil receiving means for receiving the pressurized oil from said supply means, comprising, a shaft;

a cylindrical valve body arranged around the shaft with a slight clearance between an inner periphery of the cylindrical valve body and an outer periphery of said shaft;

an annular valve body rotatably mounted around said cylindrical valve body so that at least a part of an inner periphery thereof slidably intercontacts at least a part of an outer periphery of said cylindrical valve body to thereby form interconnecting surface portions therewith;

means for relatively rotating either one of said cylindrical valve body and said annular valve body with respect to the other, first conduit means formed in said cylindrical valve body and having at least one port opening at the interconnecting surface portion of said cylindrical valve body;

second conduit means formed in said annular valve body and having at least one port opening at the interconnecting surface portion of said annular valve body, said ports of said first and second conduit means being mutually intercommunicated intermittently as the relative rotation between said cylindrical valve body and said annular valve body is effected;

means for communicating said pressurized oil supply means to one of said first and second conduit means and said oil receiving means to the other;

oil sealing means for defining a closed oil tight band zone in said clearance between said shaft and said cylindrical valve body, said zone being opposite said interconnecting surface portions; and means for supplying pressurized oil into said closed oiltight band zone so as to expand said cylindrical valve body radially outwardly, whereby the leakage of the pressurized oil out of the interconnecting surface portions is decreased.

7. A rotary type distribution valve according to claim 6, wherein said oil sealing means comprises a pair of annular oil seal rings disposed around the outer periphery of said shaft and contacting to the inner periphery of said cylindrical valve body in an oiltight manner.

8. A rotary type distribution valve according to claim 6, wherein said means for supplying pressurized oil into said closed oiltight band zone includes a check valve for preventing a reverse flow from said closed oiltight band zone.

9. A rotary type distribution valve according to claim 6, wherein said rotating means includes connecting means for securing said annular valve body to said shaft and operatingly drives said shaft together with said annular valve body relative to said cylindrical valve body.

UNITED STATES PATENT OFFICE
CERTIFICATE OF CORRECTION

Patent No. 3,586,052          Dated June 22, 1971

Inventor(s) Katsuro Abe and Kozo Ono

It is certified that error appears in the above-identified patent and that said Letters Patent are hereby corrected as shown below:

Column 1, line 9, which now reads:

" [32] Priority Mar. 14, 1968"

should read as follows:

-- [32] Priority Mar. 4, 1968 --

Signed and sealed this 7th day of December 1971.

(SEAL)
Attest:

EDWARD M. FLETCHER, JR.          ROBERT GOTTSCHALK
Attesting Officer                Acting Commissioner of Patents